United States Patent
Stecko

(10) Patent No.: US 7,380,648 B2
(45) Date of Patent: Jun. 3, 2008

(54) WORKPIECE CARRIER AND ANTI-BACKLASH MECHANISM THEREFOR

(75) Inventor: Ivan Stecko, Laval (CA)

(73) Assignee: MMC Automation Inc., Laval, Quebec (CA)

( * ) Notice: Subject to any disclaimer, the term of this patent is extended or adjusted under 35 U.S.C. 154(b) by 151 days.

(21) Appl. No.: 11/002,080

(22) Filed: Dec. 3, 2004

(65) Prior Publication Data

US 2006/0118383 A1   Jun. 8, 2006

(51) Int. Cl.
  B65G 15/64   (2006.01)
  B65G 21/22   (2006.01)
(52) U.S. Cl. ................... 198/345.3; 198/343.1
(58) Field of Classification Search ............ 198/345.3, 198/343.1, 465.1
  See application file for complete search history.

(56) References Cited

U.S. PATENT DOCUMENTS

| | | | |
|---|---|---|---|
| 3,722,663 A | 3/1973 | Nalbach | |
| 3,858,707 A * | 1/1975 | Block et al. ................. | 104/166 |
| 3,934,701 A * | 1/1976 | Mooney et al. ........... | 198/345.3 |
| 4,217,978 A * | 8/1980 | Stalker ..................... | 198/345.3 |
| 4,512,068 A * | 4/1985 | Piotrowski .................. | 29/33 P |
| 4,674,620 A * | 6/1987 | Inoue ....................... | 198/345.3 |
| 4,799,405 A | 1/1989 | Beezer et al. | |
| 4,928,806 A | 5/1990 | Anderson et al. | |
| 5,007,527 A * | 4/1991 | Ach et al. .............. | 198/867.12 |
| 5,143,195 A | 9/1992 | Bloecker | |
| 5,178,255 A * | 1/1993 | Carlson .................... | 198/346.1 |
| 5,366,062 A * | 11/1994 | Markin et al. ........... | 198/345.3 |
| 5,372,240 A * | 12/1994 | Weskamp ................. | 198/465.1 |
| 5,467,861 A | 11/1995 | Weskamp | |
| 5,579,695 A | 12/1996 | Cockayne | |
| 6,213,285 B1 * | 4/2001 | Smith ....................... | 198/465.1 |
| 6,318,546 B2 * | 11/2001 | Koegler ................. | 198/867.14 |
| 6,460,684 B1 | 10/2002 | Sullivan | |
| 6,729,231 B2 | 5/2004 | Lan | |
| 6,758,320 B1 * | 7/2004 | Tegel ....................... | 198/345.1 |
| 7,111,721 B1 * | 9/2006 | Turner ..................... | 198/345.3 |

FOREIGN PATENT DOCUMENTS

GB            2126185 A        3/1984

* cited by examiner

*Primary Examiner*—Douglas Hess
(74) *Attorney, Agent, or Firm*—Ogilvy Renault LLP

(57) ABSTRACT

An anti-backlash mechanism is provided for use in an assembly line including a conveyor transporting a plurality of pucks. The anti-backlash mechanism comprises a supporting structure adapted for being mounted adjacent the conveyor. A finger is mounted on the supporting structure and is biased in contact with the pucks to successively fall into and move out of notches defined in the pucks. The finger while being in engagement with the notches acts to block the propagation of movement from one of the plurality of pucks to other colliding pucks located upstream therefrom.

25 Claims, 3 Drawing Sheets

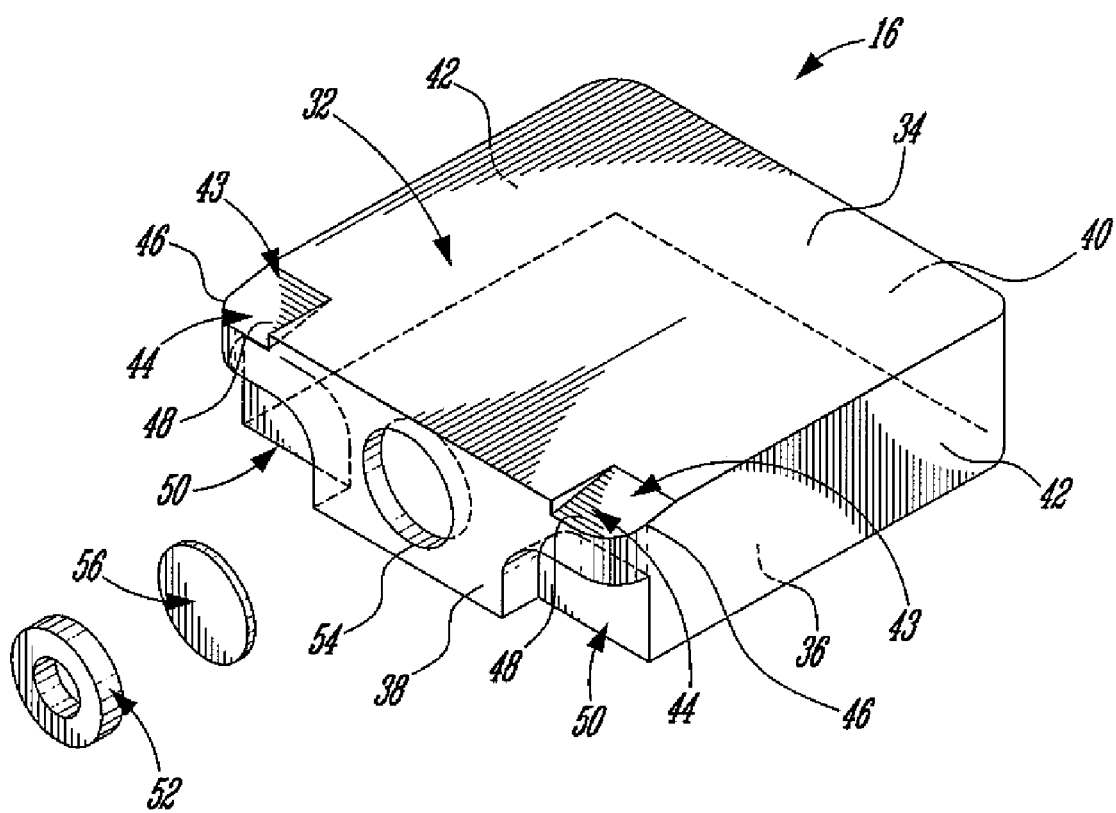
FIG_2

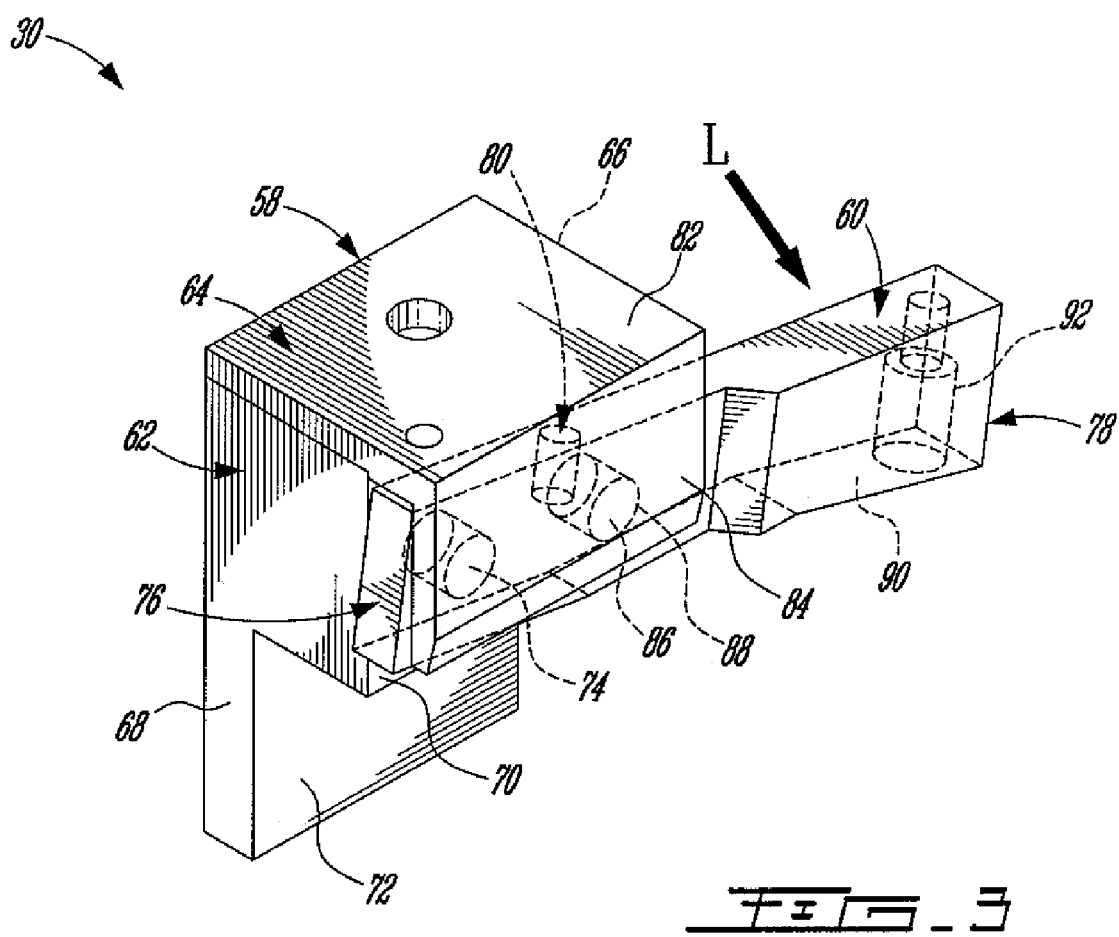
FIG_3

WORKPIECE CARRIER AND ANTI-BACKLASH MECHANISM THEREFOR

BACKGROUND OF THE INVENTION

1. Field of the Invention

The present invention relates to assembly line systems, and more particularly to pucks and anti-backlash mechanisms for blocking the propagation of movement caused by colliding pucks in an assembly line.

2. Background Art

Automated assembly lines wherein workpieces carried by pucks are conveyed from one work station to the next are well-known. In a non-synchronous assembly line, the conveyor moves continuously forward without stopping to wait for the workpieces that are being processed at a work station. In some situations, a series of pucks may accumulate at a work station where a task is being performed. As the work station completes a task and prepares to begin another, the accumulated pucks are moved forward by way of the conveyor such that the next puck up for processing assumes the required processing position.

Generally, a leading puck is stopped by a stopping assembly to properly position the leading puck or any one following it in the processing position. Abruptly stopping a leading puck with kinetic energy causes a back pressure which in turn causes collisions between pucks. Consequently, the collisions between pucks result in a form of shock propagation that decreases the placement accuracy of the puck designated for the processing position. This effect is undesirable since a work station may have problems performing the intended task on the puck if the latter is improperly placed.

Therefore, there exists a need in assembly line systems to alleviate at least the aforementioned disadvantage associated with the displacement of pucks along a conveyor.

SUMMARY OF INVENTION

It is therefore an object of the present invention to provide an anti-backlash mechanism for blocking the propagation of movement caused by colliding pucks in an assembly line.

It is therefore another object of the present invention to provide a workpiece carrying puck for use with an anti-backlash mechanism in an assembly line.

It is still another object of the present invention to provide an assembly line system adapted to provide stabilization of colliding pucks in an assembly line.

Therefore, in accordance with the present invention, there is provided an anti-backlash mechanism for use in an assembly line including a conveyor transporting a series of pucks, the anti-backlash mechanism comprising: a finger held in contact against a surface of the series of pucks, the finger moveable between a first and second position bias to the first position, the finger in the first position being engageable with anti-backlash mechanism receiving features on the surface of the series of pucks, the finger in the first position blocking the backwards movement of an adjacent preceding puck of the series of pucks, the finger in the second position disengaged with the anti-backlash mechanism receiving features yet remaining in contact with the surface of the series of pucks, and the finger in the second position sliding along the surface of the series of pucks as the series of pucks are transported by the conveyor.

In accordance with a further general aspect of the present invention, there is provided an anti-backlash mechanism for use in an assembly line including a conveyor transporting a plurality of pucks, the anti-backlash mechanism comprising: a supporting structure adapted for being mounted adjacent the conveyor, a finger operationally mounted on the supporting structure, the finger adapted to remain in contact with a surface of the plurality of pucks, the finger being bias in engagement with the pucks to successively fall into and move out of notches defined in the pucks, the finger while being in engagement with the notches acting to block the propagation of movement from one of the plurality of pucks to another of the plurality of pucks.

In accordance with a further general aspect of the present invention, there is provided an anti-backlash mechanism in combination with a series of pucks for carrying workpieces in an assembly line with a conveyor, each puck of the series of pucks including a body having a top surface, a bottom surface and at least two opposing parallel side surfaces, the top surface having a workpiece holding structure, each puck of the series of pucks having a catch engageable with the anti-backlash mechanism, the anti-backlash mechanism including a finger held in contact against a surface of the series of pucks, the finger moveable between a first and second position bias to the first position, the finger in the first position engaged with the catch of one of the pucks in the series of pucks, the finger in the first position blocking the backwards movement of an adjacent puck preceding said one puck, the finger in the second position disengaged with the catch of the pucks yet remaining in contact with the surface of the series of pucks, and the finger in the second position sliding along the surface of the series of pucks as the series of pucks are transported by the conveyor.

In accordance with a further general aspect of the present invention, there is provided an assembly line system comprising: a series of pucks adapted to individually carry workpieces to be processed, a conveyor for advancing the pucks from a first work station to a second work station, each of said first and second work stations having a stopper actuable for stopping incoming pucks thereat and a separator located upstream of said stopper for allowing the pucks comprised between the separator and the stopper to be released upon retraction of the stopper while allowing pucks upstream of the separator to remain in line at the one of the first and second work stations, and at least one anti-backlash mechanism including a finger held in contact against a surface of the series of pucks, the finger moveable between a first and second position bias to the first position, the finger in the first position engaged with the catch on the surface of one of the pucks, the finger in the first position blocking the backwards movement of an adjacent preceding puck of the series of pucks, the finger in the second position disengaged with the catch yet remaining in contact with the surface of the series of pucks, and the finger in the second position sliding along the surface of the series of pucks as the series of pucks are transported by the conveyor.

In accordance with a still further general aspect of the present invention, there is provided a puck for carrying a workpiece in an assembly line comprising an anti-backlash mechanism, the puck comprising: a body having a top surface, a bottom surface and at least two opposing parallel side surfaces for maintaining directional orientation of a front end and a back end of the puck, the top surface having a workpiece holding structure for receiving the workpiece, and a catch in the puck adapted for engagement with the anti-backlash mechanism.

DESCRIPTION OF THE DRAWINGS

Reference will now be made to the accompanying drawings, showing by way of illustration a preferred embodiment thereof and in which:

FIG. 2 is a perspective exploded view of one of the pucks according to FIG. 1; and FIG. 3 is a perspective view of the anti-backlash mechanism according to FIG. 1.

DESCRIPTION OF THE PREFERRED EMBODIMENTS

Figure 1:
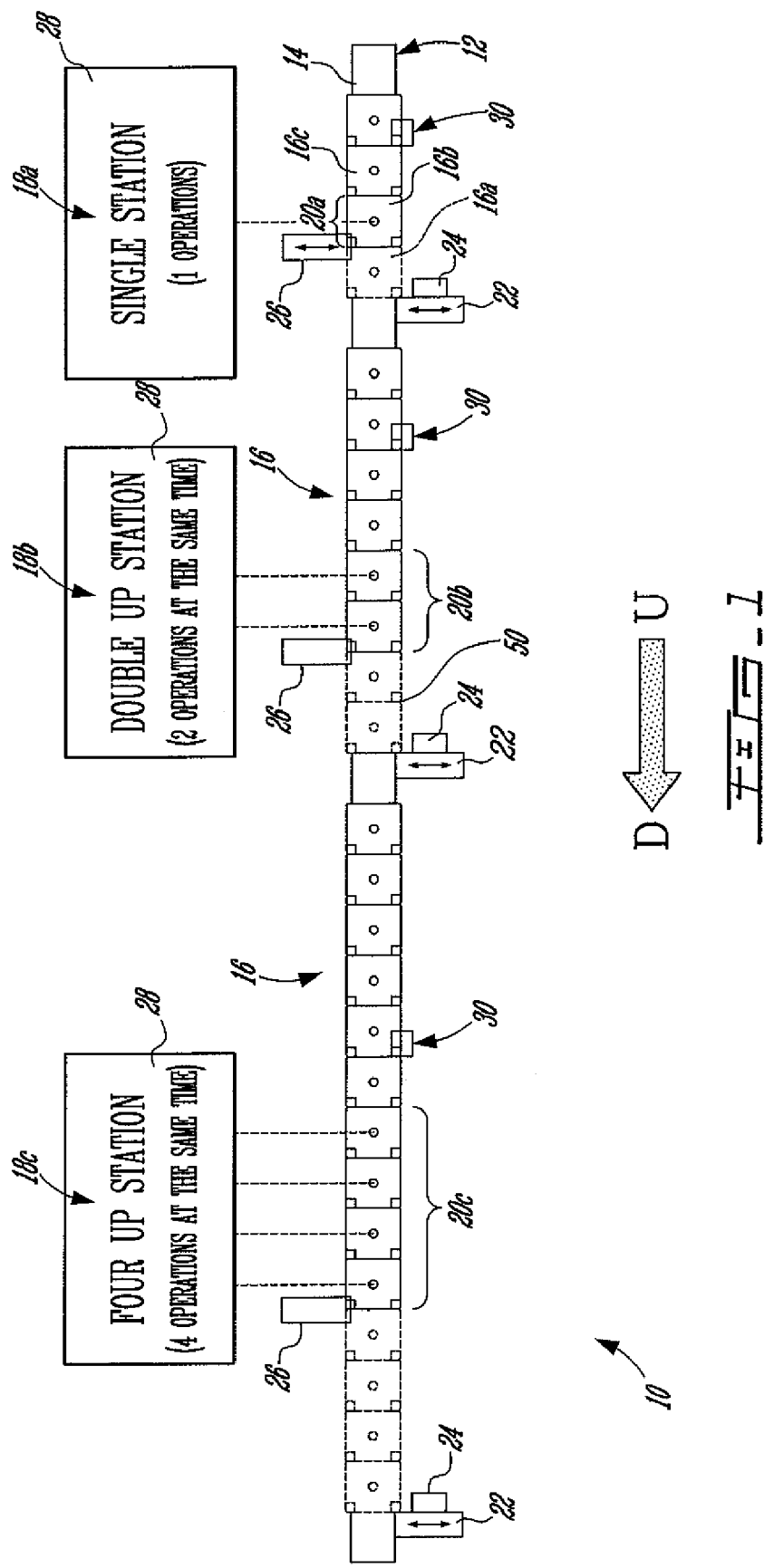
FIG. 1 is a diagrammatic view of an assembly line including a series of work stations each having a series of pucks stabilized by an anti-backlash mechanism.

Referring now to the drawings, a preferred embodiment of the present invention is illustrated. The present embodiment shown in FIG. 1 is directed to an assembly line 10, preferably of the non-synchronous automated assembly type.

The assembly line 10 includes a track 12 supporting a conveyor 14 for transporting a plurality of workpiece carriers or pucks 16 of the kind designed to carry workpieces (not shown). In this particular case, each puck 16 carries a single workpiece. Means for receiving the workpieces to be processed such as holes are preferably defined in the top surface of each puck 16 (not shown). The assembly line 10 further includes a series of work stations 18a, b & c that are adapted to receive at least one transported puck 16 in a required processing position 20a, b & c so as to perform a specific task on the corresponding workpiece of the designated puck 16.

In this exemplary embodiment, work station 18a is a single station adapted to receive one puck 16 at a time in the processing position 20a; work station 18b is a double up station adapted to receive two pucks 16 at a time; and work station 18c is a four up station adapted to receive four pucks 16 at a time. Notably, the double up station 18b takes double the time of the single station 18a to perform its respective task, while the four up station 18c takes quadruple the time of the single station 18a to perform its respective task. As illustrated in FIG. 1, the double up station 18b is located downstream of the single station 18a and the four up station is located downstream of the double station 18b. As indicated by an arrow pointing from U to D in FIG. 1, the pucks 16 are transported from an upstream position to a downstream position Furthermore, work stations 18a,b & c each have, as identified from downstream to upstream: a stopper 22 that refrains pucks 16 from moving further down the conveyor, a sensor 24 that detects the presence of a puck 16 against the stopper 22 and reacts by sending the information to a programmable controller (not shown), a puck separator 26 that is activated by a signal from the programmable controller, a processing position as previously referred to by 20a,b & c for receiving at least one puck 16 as well as processing means 28 of respective functions, and an anti-backlash mechanism 30 for alleviating the propagation of a shock caused by the collision between pucks 16 as will be clarified in detail herein further on.

Now, referring to FIG. 2, the puck 16 made for transporting workpieces along the automated assembly line 10 is illustrated. The puck 16 of this exemplary embodiment is shown as having a rectangular body 32 that is preferably square (FIG. 1). The body 32 includes a top surface 34 and a bottom surface 36 joined by a front, a rear and two opposing parallel side portions 38, 40 and 42 respectively. In effect, the front and rear portions 38, 40 correspond to the direction of motion of the puck 16.

It is advantageous for the pucks 16 to maintain a front and rear orientation so that the workpieces carried thereby remain in the same orientation. The opposing parallel side portions 38, 40 yield such a result by mating with the supporting track 12 on either side of the conveyor 14. Notably, the shape of the front and rear portions is not essential. For example, the front and rear portions may be rounded rather than flat. Therefore, it should be understood that alternative puck designs exist that still fall within the scope of this invention.

Moreover, the top surface 34 includes anti-backlash receiving features 43 configured to engageably receive the anti-backlash mechanism 30. The receiving features 43 of this embodiment are included as a pair of notches 44 acting as catches to catch the anti-backlash mechanism 30.

As illustrated in FIG. 2, the pair of notches 44 is disposed in the front corners 46 of the puck 16. Of course, the notches 44 could also be located elsewhere and still remain within the scope of this invention. Some examples include providing the notches 44 in the middle of the top surface 34 or on the side portions 42 of the puck 16; yet still others exist so long as the anti-backlash mechanism 30 as received by the puck 16 does not interfere with the primary function of the puck 16, which is to carry a workpiece.

Notably, the puck 16 could have only one notch 44 in either of the two front corners 46. In such a case, the anti-backlash mechanism 30 may need to be arranged on the same side of the track 12 as the notch 44. However, not to limit the possible arrangement of the anti-backlash mechanism 30 with respect to each work station 18a, b & c, each puck 16 is favorably provided with a pair of notches 44. Advantageously, the puck 16 is rendered more versatile by having a pair of notches 44.

Moreover, the notches 44 preferably each include an inclined plane 48 declining towards the front portion (in the downstream direction) as illustrated in FIG. 2. As such, the puck 16 design remains simple with respect to both functionality and manufacturability.

Also, the top and bottom surfaces 34, 36 are preferably flat and smooth. Therefore, the anti-backlash mechanism 30 that will be described in detail further on can slide up the inclined plane 48 and along the flat, smooth top surface 34 of each puck 16. Also, since the bottom surface 36 is supported by the conveyor 14, having a flat, smooth bottom surface 36 reduces the surface friction between the latter and the conveyor 14. In operation, the puck 16 is able to slide along the conveyor 14 when arrested by the stopper 22 or separator 26 of the work stations 18a, b & c.

Furthermore, the puck 16, as shown in FIG. 2, includes a pair of lateral cut-outs 50 in the front portion 38 thereof so as to permit the insertion of the stopper 22 or separator 26 between two pucks 16 at a given work station of the assembly line 10. Basically, the cut-outs 50 of each puck allow the elements of the work stations 18a, b & c to isolate a desired number of pucks 16.

Now still referring to FIG. 2, a bumper 52 is favorably integrated in the front portion 38 of the puck 16 to reduce the effects of the impact between colliding elements therefore improving stability during operation. According to the present embodiment, the front portion 38 of the puck 16 has an aperture 54 for receiving the bumper 52 therein such that the latter protrudes therefrom. The aperture 54 and bumper 52 are depicted as cylindrical, however the mentioned elements may be provided in various other shapes while remaining functional. Particularly, the bumper 52 may be secured within the aperture 54 by way of an adhesive 56 such as a tape, and the bumper may be provided as a urethane pill. Of course, still other alternative adhesives and bumper materials exit.

Now referring to FIG. 3, the anti-backlash mechanism 30 includes a supporting structure 58 and a puck engaging finger 60. The supporting structure 58 of this exemplary embodiment can be further described as having a core body 62 and a casing 64. Particularly, the core body 62 has a P-shaped cross section extending from a front to a rear facet 66 and 68 respectively, whereby the front facet 66 is downstream of the rear facet 68. Furthermore, the core body 62 has a superior and an inferior inside facet 70, 72. In effect, the anti-backlash mechanism 30 is adapted to be mounted adjacent the conveyor 14, and more specifically against a lateral edge of the track 12 such that the inferior inside facet 72 thereof is flanking the track 12.

Moreover, the finger 60 of the anti-backlash mechanism 30 is operationally mounted on the supporting structure 58. Preferably, the finger 60 is pivotally mounted adjacent the superior inside facet 70 of the core body 62 by way of a pin 74. Operationally, the finger 60 pivots about the pin 74 in the plane of the superior inside facet 70.

As shown in FIG. 3, the finger 60 includes a first end 76 and a second end 78, and is positioned parallel to the conveyor 14 with the first end 76 furthest upstream. The pin 74 is exemplified as being situated at the first end 76 of the finger 60, connecting the latter to the core body 62.

In addition, a spring 80 is provided between the finger 60 and the supporting structure 58 to spring-bias the finger 60 against the top surface 34 of the pucks 16. The finger 60 is displaceable between a first and second position with the finger 60 being bias to the first position by the spring. When in the first position, the finger 60 is in engagement with the puck 16, and more particularly it is held in contact against the top surface 34 of the puck 16 such that it engages with the inclined plane 48 provided in the front corner 46 of the puck 16. When in the second position, the finger 60 still remains in contact with the top surface 34 of the puck 16 but has elevated by moving up the inclined plane 48 and therefore away from the notch 44 to assume the second position. In the second position the spring 80 is in compression.

Still referring to FIG. 3, the casing 64 includes a top portion 82 and a lateral portion 84 that are preferably joined at a right angle. The casing 64, which is included as part of the supporting structure 58, is designed to be place over the core body 62 and finger 60 to act as a top and lateral cover thereof. The top portion 82 of the casing 64 acts to arrest the finger 60 from pivoting beyond the second position: keeping the finger 60 continuously in contact with the puck 16. The lateral portion 84 of the casing 64 prevents the finger 60 from undergoing any lateral movement (movement away from the plane of the superior inside facet 70) as the pin 74 attachment may not necessarily be able to withstand a force in the lateral direction as demonstrated by an exemplary arrow labeled L in FIG. 3.

Additionally, the finger 60 includes a slot 86 that is preferably longitudinally shaped, extending in length in the direction of up and down motion of the finger 60. In this exemplary embodiment the slot 86 is shown to be disposed in a central location of the finger 60, downstream of the pin 74; however, it may be located elsewhere adjacent the superior inside facet 70. Further included on the superior inside facet 70 is a protruding piece 88 for engagement with the slot 86. The protruding piece 88 extends laterally through the slot 86 limiting the downward pivotal movement of the finger 60 to no further than the first position. Such a mechanism is in place particularly for the situation where the series of pucks 16 transported by the conveyor 14 may not be one adjacent the next. As such, the slot 86 and protruding piece 88 maintain the finger 60 in the first position even when not in contact with a puck 16 until the arrival of a puck 16.

Also, a weight (not illustrated) can be added to the finger 60 of the anti-backlash mechanism 30 such that the finger 60 is urged even further to be bias to the first position. In effect, the weight would increase the down force applied to the inclined plane 48 of the top surface 34 of the puck 16. Such a situation may be advantageous depending on the weight and size of the pucks 16 of the assembly line 10. Ideally, the weight would be included in the second end 78 of the finger 60 furthest downstream.

Essentially, the pivotally mounted spring loaded finger 60 is propitiously suited for mating with the notch 44 of a puck 10. Preferably, the finger 60 has a slanted end surface 90 for sitting on the inclined plane 48. Additionally, the finger 60 has a vertical front surface 92 for contacting the rear portion 40 of a puck 16 immediately downstream of the puck in engagement with the anti-backlash mechanism 30 and refraining the puck immediately downstream from moving back upstream. Thus, the finger 60 acts to block the transmission of back pressure from one puck to the next caused by the downstream arrest of a leading puck 16 of a queue of pucks by the stopper 22 of a work station 18a, b & c.

Now, referring back to FIG. 1, the functions of the above described assembly line 10 elements will be further elucidated. As noted above, the work stations 18a,b & c of this exemplary embodiment differ only in the number of pucks on which they operate, in the time they necessitate to complete the operation, and in the actual nature of the operation itself. Essentially, all three work stations 18a, b & c include similar elements (listed above) functioning in an identical sequence; thus, the description particularly relating to the interactions between the elements will be restricted to the single work station 18a from hereon. It is to be understood that the same applies for the double up and four up work stations 18b & c.

Referring still to FIG. 1, the stopper 22 and the separator 26 are preferably of similar construction and may be provided in the form of fluid actuated reciprocating fingers transversely movable in and out of the path defined by the conveyor 14. Both the stopper 22 and the separator 26 are moveable between a puck engaging position and a disengaged position. In effect, a reciprocating relationship exists between the above stated elements, the link between the two being the sensor 24. When one of the above elements moves to the puck engaging position, the other contrarily moves to the disengaged position and vise versa. Notably, the reciprocating movement between the stopper 22 and the separator 26 may or may not be simultaneous.

Furthermore, the stopper 22 and the separator 26 are positioned apart by the length of N pucks, one for the first station 18a (where N represents a positive whole number). This is characteristic of the fact that the work station 18a operates solely on one puck at a time, therefore discharging a single puck from the processing position to move forward to a position between the stopper 22 and the separator 26.

Now, the sequence of operation of the elements of the work station 18a with respect to the pucks 16 will be described in detail. In operation, the stopper 22 in the puck engaging position brings a single or a queue of pucks 16 transported by the conveyor 14 to a standstill. Once a leading puck 16a, shown in FIG. 1, makes contact with the stopper 22, the sensor 24 detects the arrival thereof and notifies the separator 26 to shift into puck engaging position. The separator 26, which is arranged to abut the leading puck 16a, acts to separate the latter from the next puck in line 16b that is adjacent thereto. Effectively, the next puck in line 16b is designated for the processing position 20a.

Then, the stopper 22 shifts to the disengaged position to allow the leading puck 16a to be transported further down the assembly line 10 while the separator 26 acts to refrain the next puck in line 16b from moving out of the processing position. As noted above, the conveyor 14 is continuously in forward motion; hence, without an impeding element in the pathway of the transported pucks 16, the latter would continue to move downstream.

In summary, a leading puck 16a is stopped by a stopper 22 in such a manner that a next puck in line 16b is brought to a standstill in the processing position 20a. Effectively, the stopper 22 allows positioning and separation of the pucks 16 without the need of highly precise control of the separator 26. For instance, if the assembly line 10 did not include a stopper 22 but only a separator 26, the latter would have to shift into a puck stopping/separating position, as soon as a puck would leave the processing position 20a, at a very specific point in time for separating an immediately following puck 16.

Now the present embodiment is extended to the case where the conveyor 14 transports the pucks at a considerable speed, the arrest of the leading puck 16a which has kinetic energy causes the latter to impart motion onto the next puck in line 16b and so on as the pucks 16 collide into each other. The kinetic energy is transmitted as a shock wave from one puck to the next, moving the pucks backwards away from the desired position. Essentially, it is the position of the next puck in line 16b that is of utmost importance as the processing means 28 necessitate that the processing position 20a be correctly filled.

Thus, the anti-backlash mechanism 30 comes into play having a vital role in alleviating the back pressure caused by colliding pucks 16. As it is positioned upstream of the stopper 22 and the processing position 20a, it rigidly opposes the queue of pucks imparted with kinetic energy from moving back upstream and out of required position. In fact, the work stations are programmed so that the anti-backlash mechanism 30 is in the puck engaging first position upon arrest of a leading puck further downstream.

Once the processing means 28 carry out their respective tasks, the cycle continues as the queue of pucks 16 are transported downstream before being arrested by the stopper 22 once again. During puck changeover the anti-backlash mechanism 30 moves out of a puck engaging first position to a second position as aforesaid, by sliding up the inclined plane 48 and along the top surface 34 of a puck 16 being conveyed downstream. Once the rear portion 40 of the puck 16 passes the front surface 92 of the finger 60, the finger 60 then simply drops from the second position back down into the first position to mate with the inclined plane 48 of a following puck 16.

As stated above, when in the first position the front surface 92 of the finger 60 is able to make contact with the rear portion 40 of the puck immediately downstream thereof; therefore the latter is refrained from moving back upstream because the finger 60 rigidly opposes the back pressure. Essentially, the anti-backlash mechanism 30 repeatedly moves from the first position to the second position as it engages one puck 16 after another of a queue of passing by pucks 16.

It is to be understood that the anti-backlash mechanism 30 could be designed differently. For example, the finger 60 could engage the side portions 42 of the pucks 16 instead of the top surface 34. Thus, it is implied that the finger 60 may then be mounted to the supporting structure 58 in a manner differing from that which was taught in detail. In fact, there exist many alternatives which can be employed and still fall within the scope of the present invention.

Other suitable assembly line configurations, work station assemblies, as well as differently designed components are available and will be apparent to those skilled in the art. Thus, while certain embodiments of the present invention have been illustrated and described, the invention is not to be limited to the specific forms or arrangements of parts described and shown above, since others skilled in the art may devise other embodiments still within the limits of the claims.

I claim:

1. An anti-backlash mechanism for use in an assembly line including a conveyor transporting a series of pucks, the anti-backlash mechanism comprising:

a finger held in contact against a surface of the series of pucks, the finger moveable between a first and second position bias to the first position, the finger in the first position being engageable with anti-backlash mechanism receiving features on the surface of the series of pucks, the finger in the first position blocking the backwards movement of an adjacent preceding puck of the series of pucks, the finger in the second position disengaged with the anti-backlash mechanism receiving features yet remaining in contact with the surface of the series of pucks, and the finger in the second position sliding along the surface of the series of pucks as the series of pucks are transported by the conveyor.

2. The anti-backlash mechanism of claim 1, further comprising a supporting structure adapted for being mounted adjacent the conveyor.

3. The anti-backlash mechanism of claim 2, wherein the finger is operationally mounted on the supporting structure.

4. The anti-backlash mechanism of claim 3, further comprising a pin for pivotally mounting the finger to the supporting structure.

5. The anti-backlash mechanism of claim 4, further comprising a spring to spring-bias the finger against the surface of the series of pucks, the finger being biased to the first position by the spring.

6. The anti-backlash mechanism of claim 4, wherein the finger has a first end opposing a second end, the first end pinned to the supporting structure by the pin, and the second end for engagement with the anti-backlash mechanism receiving features of the series of pucks.

7. The anti-backlash mechanism of claim 4, wherein the supporting structure includes a casing for limiting upward pivotal movement of the finger and for limiting lateral movement of the finger relative to the supporting structure.

8. The anti-backlash mechanism of claim 4, wherein the finger further includes a weight for providing a downwards force to the surface of the series of pucks.

9. The anti-backlash mechanism of claim 8, wherein the weight is provided at one end of the finger opposite the point of pivot thereof.

10. The anti-backlash mechanism of claim 2, wherein the finger includes a slot and the supporting structure includes a protruding piece insertable in the slot for engagement therewith to limit pivotal movement of the finger relative to the supporting structure.

11. The anti-backlash mechanism of claim 10, wherein the finger has a first end opposing a second end, the first end pinned to the supporting structure by the pin, and the second end for engagement with the anti-backlash mechanism receiving features of the series of pucks, and wherein the slot included in the finger is located between the pinned first end and the second end.

12. An anti-backlash mechanism for use in an assembly line including a conveyor transporting a plurality of pucks, the anti-backlash mechanism comprising: a supporting structure adapted for being mounted adjacent the conveyor, a finger operationally mounted on the supporting structure, the finger adapted to remain in contact with a surface of the plurality of pucks, the finger being biased in engagement with the pucks to successively fall into and move out of notches defined in the pucks, the finger while being in engagement with the notches acting to block the propagation of movement from one of the plurality of pucks to another of the plurality of pucks.

13. The anti-backlash mechanism of claim 12, wherein the finger is pivotally mounted to the supporting structure.

14. The anti-backlash mechanism of claim 13, wherein said finger is biased against the plurality of pucks by a spring extending between said supporting structure and the finger.

15. The anti-backlash mechanism of claim 14, wherein the finger defines a slot and the supporting structure includes a protruding piece engaged in the slot for limiting pivotal movement of the finger relative to the supporting structure.

16. The anti-backlash mechanism of claim 15, wherein the finger has a first end opposing a second end, the first end being pivotally pinned to the supporting structure, and the second end for engagement with the notches of the plurality of pucks.

17. The anti-backlash mechanism of claim 16, wherein the slot included in the finger is located between the pinned first end and the second end.

18. The anti-backlash mechanism of claim 17, wherein the supporting structure includes a casing for limiting upward pivotal movement of the finger and for limiting lateral movement of the finger relative to the supporting structure.

19. The anti-backlash mechanism of claim 18, wherein the finger further includes a weight for providing a downwards force to the surface of the plurality of pucks.

20. The anti-backlash mechanism of claim 19, wherein the weight is included at the second end of the finger.

21. An anti-backlash mechanism in combination with a series of pucks for carrying workpieces in an assembly line with a conveyor, each puck of the series of pucks including a body having a top surface, a bottom surface and at least two opposing parallel side surfaces, the top surface having a workpiece holding structure, each puck of the series of pucks having a catch engageable with the anti-backlash mechanism, the anti-backlash mechanism including a finger held in contact against a surface of the series of pucks, the finger moveable between a first and second position bias to the first position, the finger in the first position engaged with the catch of one of the pucks in the series of pucks, the finger in the first position blocking the backwards movement of an adjacent puck preceding said one puck, the finger in the second position disengaged with the catch of the pucks yet remaining in contact with the surface of the series of pucks, and the finger in the second position sliding along the surface of the series of pucks as the series of pucks are transported by the conveyor.

22. The combination as defined in claim 21, wherein said finger has a pivot axis and is urged in engagement with the top surface of the pucks.

23. The combination as defined in claim 21, wherein the catch is disposed in the front end of each puck and is opened frontward for allowing the finger to make contact with a preceding adjacent puck in the assembly line.

24. The combination as defined in claim 23, wherein the catch includes at least one notch, the notch being disposed in one of the top surface and the side surfaces in the front end of the puck.

25. The combination as defined in claim 24, wherein the notch includes an inclined plane declining towards the front end of each puck.

* * * * *